OR 3,456,192

SEARCH ROOM x 5397 W
x 5326 W

July 15, 1969 S. A. MIXSELL ET AL 3,456,192

AUDIENCE SURVEY SYSTEM

Filed April 22, 1968 4 Sheets-Sheet 1

INVENTORS
STEPHEN A. MIXSELL
HANSEL B. MEAD

BY LeBlanc & Shur

ATTORNEYS

July 15, 1969 S. A. MIXSELL ET AL 3,456,192

AUDIENCE SURVEY SYSTEM

Filed April 22, 1968 4 Sheets-Sheet 2

DECISION LOGIC CIRCUIT

United States Patent Office 3,456,192
Patented July 15, 1969

3,456,192
AUDIENCE SURVEY SYSTEM
Stephen A. Mixsell, Melbourne, and Hansel B. Mead, Eau Gallie, Fla., assignors to Teltronic Measurement Systems, Inc., New York, N.Y., a corporation of Delaware
Continuation-in-part of application Ser. No. 608,589, Jan. 11, 1967. This application Apr. 22, 1968, Ser. No. 723,136
Int. Cl. H04b *1/36*
U.S. Cl. 325—31 18 Claims

ABSTRACT OF THE DISCLOSURE

Disclosed is a monitor for ascertaining the listening habits of radio and television users by detecting signals generated by the local oscillators of the radio and television sets. Each monitor channel is provided with a comb filter and parallel signal transmission paths feeding a data logic decision circuit. The dual path construction provides better noise rejection and greater sensitivity and increased accuracy.

This application is a continuation-in-part of copending application Ser. No. 608,589 filed Jan. 11, 1967.

The present invention relates to a device for monitoring the listening habits of radio and television users, and particularly in the latter, by detecting signals transmitted from the local oscillator of the user receiving sets. In the monitor of the present invention, the signals from the local oscillators of all sets tuned to the same television station are passed through a separate channel in the monitor where the signals are counted and tabulated to give an indication of the rating or share of audience for each program or broadcast station. Improved operation is obtained by passing the signal in each channel through parallel paths particularly designed to reject undesirable noise so as to improve the accuracy and reliability of the audience count obtained by the monitor.

In copending application Ser. No. 608,589, filed Jan. 11, 1967, there is disclosed an audience survey monitor for detecting local oscillator signals from radio and television sets and particularly from television sets. The system of that application, while usable in an aircraft such as is disclosed in U.S. Patent 3,299,355, is particularly designed for use on a tower elevated above the buildings in the area to be monitored so as to provide a direct and substantially unobstructed radiation path to the monitor from the television sets in a surrounding metropolitan area.

In the system of the above-mentioned copending application, the monitor accomplishes the TV counting process by sweeping (electronic tuning) across the band spread of three to four megahertz occupied by the TV local oscillator signals from sets tuned to the same transmitting station. That system can resolve between local oscillator signals (sets) by the small differences in frequency between these local oscillator signals. It is generally accepted that the television set local oscillator signals are not inherently frequency stable and, in fact, the frequency can be moved by the TV fine set tuning adjustment over a 3 to 4 megahertz range, i.e., usually about 3.5 magahertz. Thus, the probability of any two sets being tuned to the same frequency is extremely small.

In systems of this type, frequency separation is obtained by comparing the frequency of the incoming local oscillator signal in a mixer with the output of a sweep generator i.e., a local oscillator whose output frequency is swept through a 3 to 4 megahertz range. The mixer output is fed through a filter so that the incoming local oscillator signals in effect pass through a moving frequency slot having the bandwidth of the filter, to the monitor counters where they are counted and tabulated.

The ability to distinguish between local oscillator signals differing only slightly in frequency is largely dependent upon two factors, i.e., the filter bandwidth and the sweep rate or sweep speed of the local oscillator. However, there are practical limits to the bandwidth and sweep speed which may be employed in the monitor beyond which too many signals are lost to noise and other factors.

The present invention provides an improved receiver arrangement for optimizing both the bandwidth of the moving frequency slot and the sweep speed so as to increase the ability of the monitor to distinguish between local oscillator signals very close in frequency while, at the same time, substantially reducing the number of signals lost to interference and noise. In the device of this invention, the output from the mixer in each channel is fed to a comb filter supplying two parallel signal transmission paths which feed a binary logic type decision circuit. Thus, in effect, each monitor channel is provided with a pair of spaced moving frequency slots through which the incoming local oscillator signals may pass to the counter. If for some reason, such as because of interference or noise, the signal fails to pass through one of the slots, there is a good chance that it will be picked up by the other slots and passed to the counter to give a desired and accurate count. In addition, the parallel transmission paths make it possible to distinguish between local oscillator signals and many types of noise, particularly impulse noise, so that the noise itself does not produce an inaccurate count in the monitor.

It is therefore one object of the present invention to provide an improved audience survey monitor.

Another object of the present invention is to provide an improved monitoring system for detectin glocal oscillator signals from radio and television receiving sets.

Another object of the present invention is to provide an improved noise rejection system for a monitor adapted to receive local oscillator signals from the sets of a television listening audience.

Another object of the present invention is to provide an improved audience survey monitor having improved noise rejection, increased sensitivity, and greater accuracy. Each channel in the monitor is provided with a comb filter to define, in conjunction with a swept local oscillator, a pair of spaced moving frequency slots for passing TV local oscillator signals in a predetermined band corresponding to one of the possible stations to which the receiving sets may be tuned. The comb filter feeds a pair of parallel transmission paths coupled to a binary logic decision circuit for deciding whether a signal appearing in one or both of the transmission paths is a local oscillator signal to be counted or is a noise signal to be rejected. Once this determination has been made, the signal is fed through the decision circuit to a monitor counter where the signals for each of the channels are counted and tabulated.

These and further objects and advantages of the invention will be more apparent upon reference to the following specification, claims and appended drawings wherein:

Figures 1, 2:
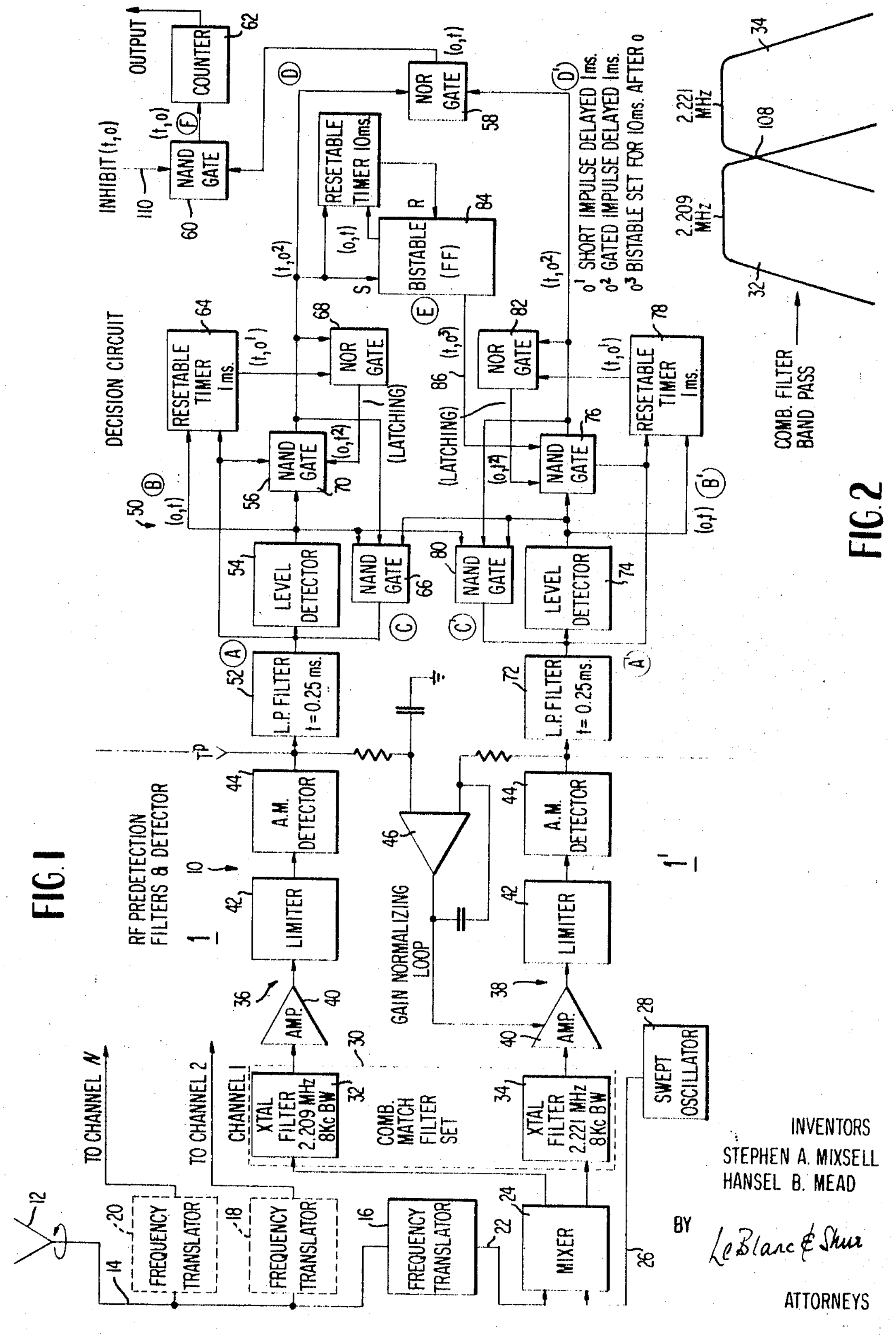
FIGURE 1 is a simplified block diagram of a portion of the audience survey monitor constructed in accordance with the present invention.
FIGURE 2 shows the passband for the comb filter of one of the channels of the monitor of FIGURE 1.

As previously mentioned, the ability of a moving frequency slot type monitor to distinguish between local oscillator signals very close in frequency, is largely dependent upon the slot bandwidth and the sweep speed. The narrower the slot bandwidth, the more able the monitor to distinguish between signals closely adjacent in frequency. However, if the slot bandwidth is made too small and the sweep speed is not correspondingly reduced, the moving frequency slot passes too rapidly through the frequency of the local oscillator signals and many signals are lost to noise. The problem of optimum bandwidth and sweep speed is further complicated by the fact that the television local oscillator signals have been found to carry a certain amount of frequency modulation. With a narrow bandwith, if the sweep rate is too slow, lost signals and false counts are encountered because of the modulation.

For example, a bandwidth of eight kilohertz for the moving frequency slot represents approximately $\frac{1}{400}$ of the band spread of the TV local oscillator signals tuned to any given station. This results in a quite high resolution for a large number of TV sets. Since the receiver is electronically tuned (swept) across the band spread, an impulse of RF energy is available through the predetection filter, determining the slot width as the receiver is tuned across the TV local oscillator signal. The width of the impulse is both a function of the sweep rate and the bandwidth of the predetection filter. It is obvious that it would be desirable to make the predetection filter bandwidth as narrow as possible since this would still better the system resolution and would increase receiver sensitivity, thereby increasing its range. Further narrowing the predetection bandwidth, however, requires that the sweep rate must also be slowed and it has been found that there are practical limitations between the sweep speed and bandwidth which limit how much this can be done.

Past experiments in trying to optimize the sweep rate and predetection bandwidths have been frustrated by the discovery of two parameters that create an almost impossible solution to optimizing a single transmission path channel. These two parameters are the residual frequency modulation of the television local oscillator signal and man made impulse noise. Experiments on large samples of TV sets have shown that the frequency of the television local oscillator signal is in fact frequency modulated a small amount. The modulation rate is almost entirely at the frequency of the vertical oscillator used in the TV picture scan circuit. The deviation of the TV local oscillator frequency is generally less than 16 kilohertz peak-to-peak. Thus, if the sweep speed is slowed so that the TV local oscillator is in the passband for a longer time than the impulse noise lasts, the decision circuit can distinguish between legitimate signals and impulse noise. However, when using a narrow filter passband, residual FM of large deviations sets can deviate in and out of the eight kilohertz filter passband. This confuses the decision circuit, causing it to make errors or even multiple counts for one signal with large residual FM. Increasing the sweep speed to a rate faster than that of the residual FM rate greatly eases this problem but the impulse noise again confuses the decision circuit. The net result is that the single transmission path receiver has a short term, small random error between successive samples caused by these two discussed parameters and the solution to one is not conducive to solving the problem resulting from the other.

The dual transmission path monitor of the present invention offers a very satisfactory solution to this two-fold problem while, at the same time, making it possible to provide an optimum speed rate and predetection filter bandwidth.

Referring to the drawings, and particularly to FIGURE 1, the novel audience survey monitor of the present invention is generally indicated at 10 and comprises a rotatable directional antenna 12, coupled by way of lead 14 to a plurality of channels labeled channel 1, channel 2, and channel N. It is understood that there is at least one channel in the monitor for each of the television transmitting stations to which the receiving sets to be monitored may be tuned. While the monitor may be provided with individual antennas for each channel, in the preferred embodiment only a single antenna 12 is used and the incoming local oscillator signals are separated into different bands 3 to 4 megahertz wide, by frequency translators 16, 18, and 20. Thus, local oscillator signals from all sets tuned to one TV station, pass through translator 16 and similarly the local oscillator signals from sets tuned to the other stations pass through respective translators 18 and 20 in the respective channels as indicated. Since all channels are otherwise of identical construction, only channel 1 is illustrated and described in detail.

Local oscillator signals passing through frequency translator 16 are supplied to one input 22 of a mixer 24. The other input 26 of the mixer receives a signal from a sweep generator 28 which may comprise a voltage controlled oscillator whose output signal is swept through the 3 to 4 megahertz band corresponding to the band in which the local oscillator signals passing through translator 16 fall. By way of example only, sweep generator 28 may comprise an oscillator including a voltage controlled reactance, such as a varicap, whose reactance is varied in accordance with an applied saw-tooth voltage in the manner shown and described in assignee's copending application Ser. No. 712,285, filed Mar. 11, 1968, entitled "Linear Frequency Swept Oscillator".

The output from mixer 24 is fed to a comb filter or matched filter set 30 comprising a first crystal filter 32 and a second crystal filter 34. In the embodiment illustrated, filter 32 has an 8 kilohertz pass bandwidth about a center frequency of 2.209 megahertz. Crystal filter 34 similarly has an 8 kilohertz bandwidth centered about a frequency of 2.221 megahertz. The passbands of the comb filter 30 are illustrated in FIGURE 2 with the passband of filter 32 illustrated as centered about a slightly lower frequency than the passband of filter 34. Comb filter 30 comprising the above-mentioned RF predetection filter, feeds a pair of parallel transmission paths, generally labeled 36 and 38, and each comprising an RF amplifier 40, a limiter 42, and an AM detector 44. Connected in a gain normalizing loop between transmission paths 36 and 38, hereinafter referred to as paths A and A′ in channel 1, is a control amplifier 46.

The two outputs from the comb filter 30, by way of transmission paths A and A′, are fed to a binary logic type decision circuit, generally indicated at 50 in FIGURE 1. Transmission path A, through the decision circuit, includes a low pass filter 52, level detector 45, NAND gate 56, NOR gate 58, and through a NAND gate 60 to a monitor counter 62 where the pulses from NAND gate 60 are counted and tabulated in relation to similar pulses from the other channels to indicate audience share and rating for each of the TV stations in the area being monitored. In transmission path A, the output of level detector 54 is connected both to a resettable timer 64 and to a NAND gate 66. Resettable timer 64 feeds a NOR gate 68 which, in turn, supplies a latching signal by way of lead 70 to NAND gate 56.

Similarly, the transmission path A′, through decision circuit 50, includes a low pass filter 72, level detector 74, and NAND gate 76, feeding the previously described NOR gate 58, connected to NAND gate 60 and to the counter 62. The output from level detector 74 is connected to a second resettable timer 78 and to a NAND gate 80. Resettable timer 78 feeds NOR gate 82, in turn supplying a latching signal to NAND gate 76.

The only difference between the two paths A and A′ in the decision circuit is that the output of NAND gate 56 in transmission path A is connected to a bistable or flip flop 84 controlled by a resettable timer 86. The output of flip flop 84 supplies an inhibiting pulse by way of lead 86 to NAND gate 76 in channel A′.

Figure 3:
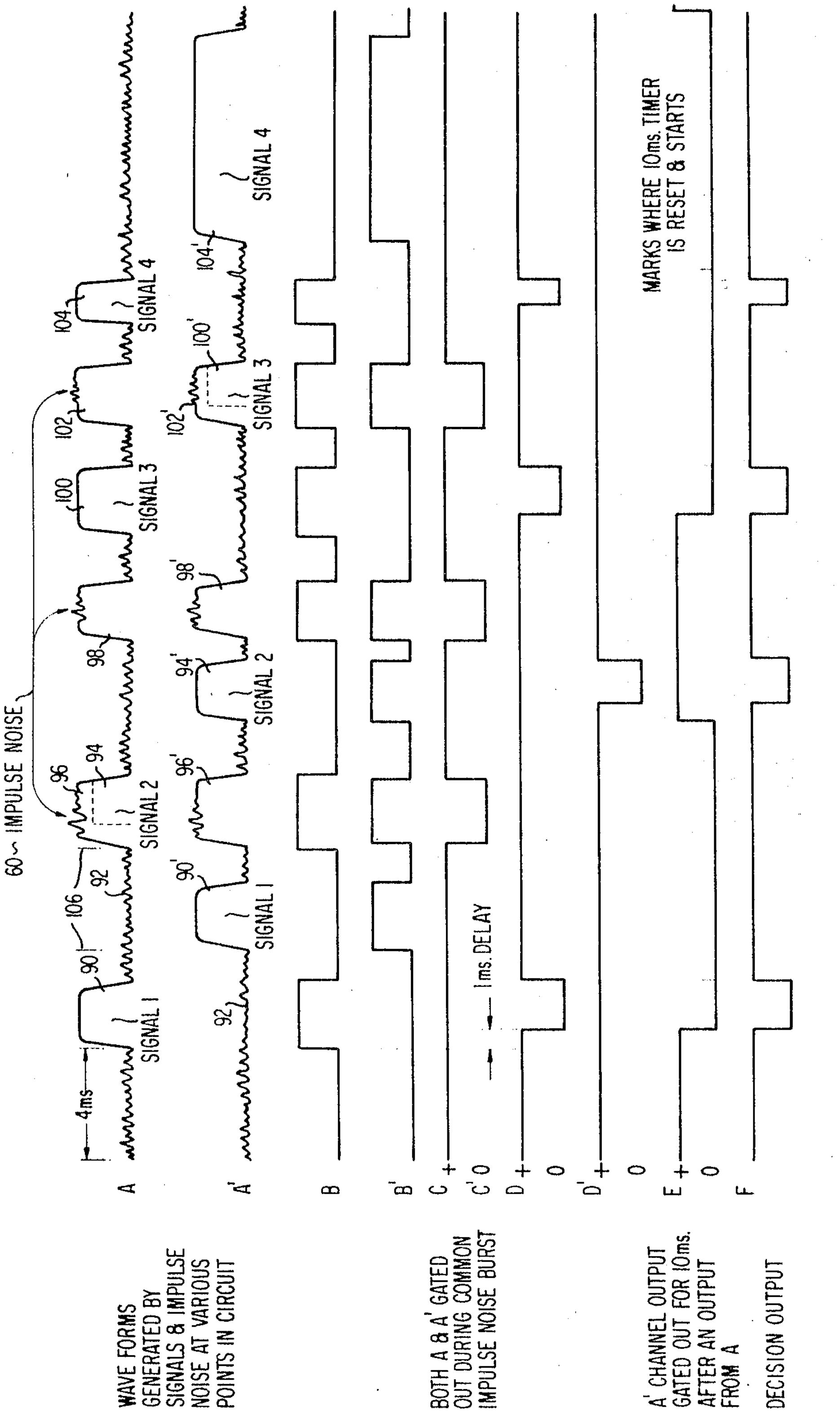
FIGURE 3 is a set of wave forms showing the signals appearing at various locations in the monitor channel illustrated in detail in FIGURE 1.

FIGURE 3 shows waveforms occurring at various points in transmission paths A and A′ of channel 1, as illustrated in FIGURE 1. In FIGURE 3, the unprimed letters refer to points in transmission path A, whereas the primed letters refer to the waveforms occurring at corresponding points in the second transmission path A′ of channel 1. Waveform A in FIGURE 1 shows a typical output from the low pass filter 52 of FIGURE 1 as passed from antenna 12 through translator 16, mixer 24, and crystal filter 32 of the comb filter 30. Waveform A shows a first TV local oscillator signal labeled 90 superimposed on background noise 92, a second signal 94 obscured by a noise impulse 96, a second noise impulse 98, a third local oscillator signal 100, a third noise impulse 102, and a fourth local oscillator signal 104. Noise impulses 96, 98, and 102 are typical 60-cycle power frequency noise impulses picked up by antenna 12. The spacing of timing marks 106 is representative of a time period of four milliseconds.

Waveform A′ in FIGURE 3 shows the output from low pass filter 72 in FIGURE 1 for the same time interval as is covered by the waveform A. The same signals, both local oscillator and noise, appear in waveform A′; as appear in waveform A with the exception that the local oscillator signals occur at a later point in time, since the moving frequency slot defined by crystal filter 34 reaches the frequency of the local oscillator signal shortly after that frequency has been reached by the moving frequency slot defined by crystal filter 32. Since the noise, i.e., both background noise 90, and the noise impulses, are broad band, they are passed through both moving frequency slots at the same time so that they have a similar appearance, both as to time of occurrence and shape in each of the waveforms A and A′. Local oscillator signals 90, 94, and 100 are also illustrated as of similar shape in the two waveforms. However, local oscillator signal 104 is illustrated as much longer in waveform A′ and shows the difference in shape which can occur for the most severe case of residual frequency modulation on the signal, i.e., residual FM of 16 kc. peak-to-peak. The corresponding signals are all primed in waveform A′.

Waveforms B and B′ in FIGURE 3 show the output signals respectively from level detector 54 in transmission path A and level detector 74 in transmission path A′. Waveforms C and C′ in FIGURE 3 are the outputs from the NAND gates 66 and 80 respectively. Waveforms D and D′ show the outputs from NAND gates 56 and 76, respectively, supplied to NOR gate 58 of FIGURE 1. Waveform E shows the effect on NAND gate 76 of an inhibit signal from flip flop 84 and finally waveform F in FIGURE 3 is the output from NAND gate 60 supplied to the counter 62.

Figure 4:
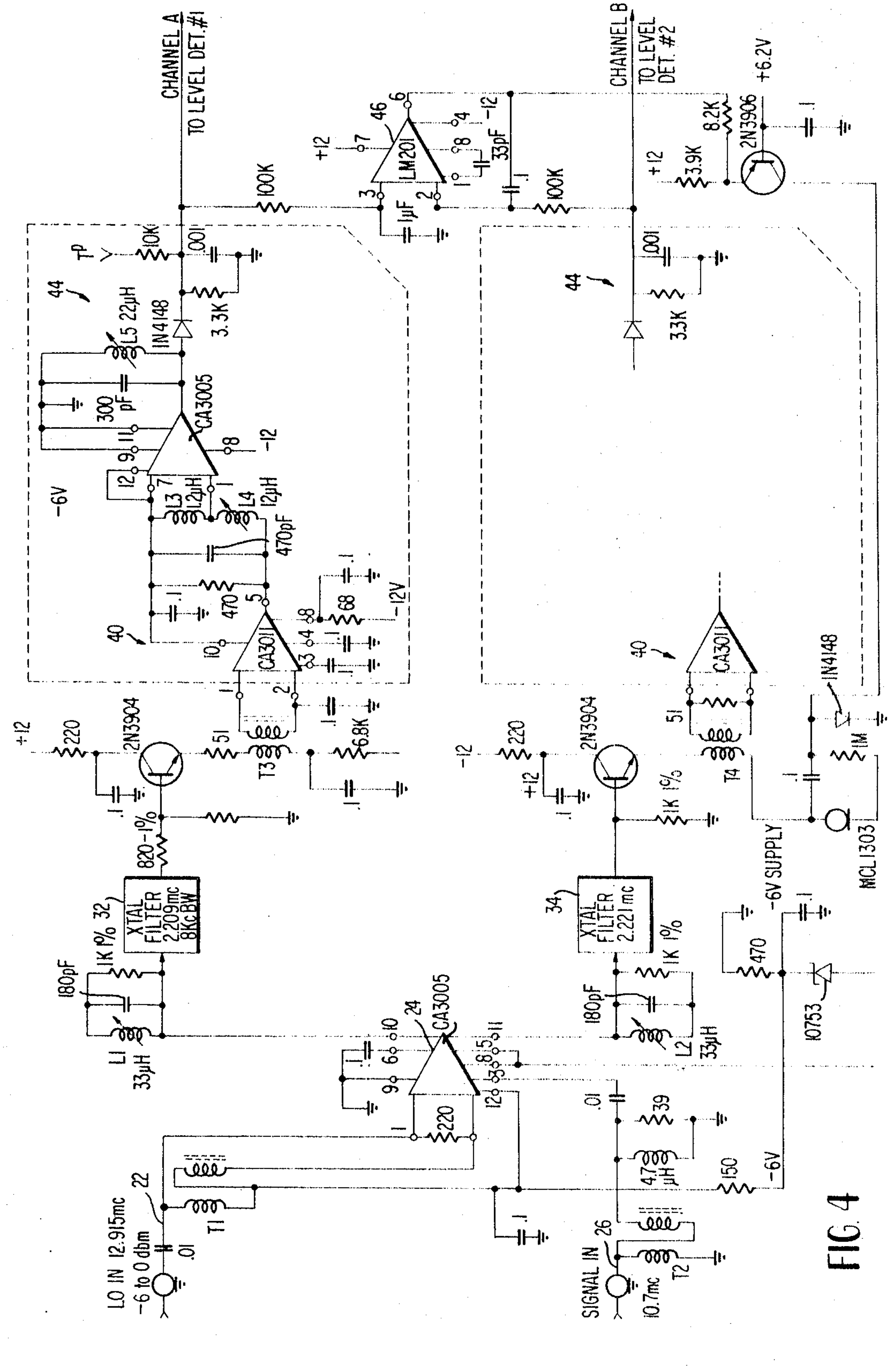
FIGURE 4 is a more detailed circuit diagram of the predetection filter and detector portion of one of the channels of the monitor of FIGURE 1.
Figure 5:
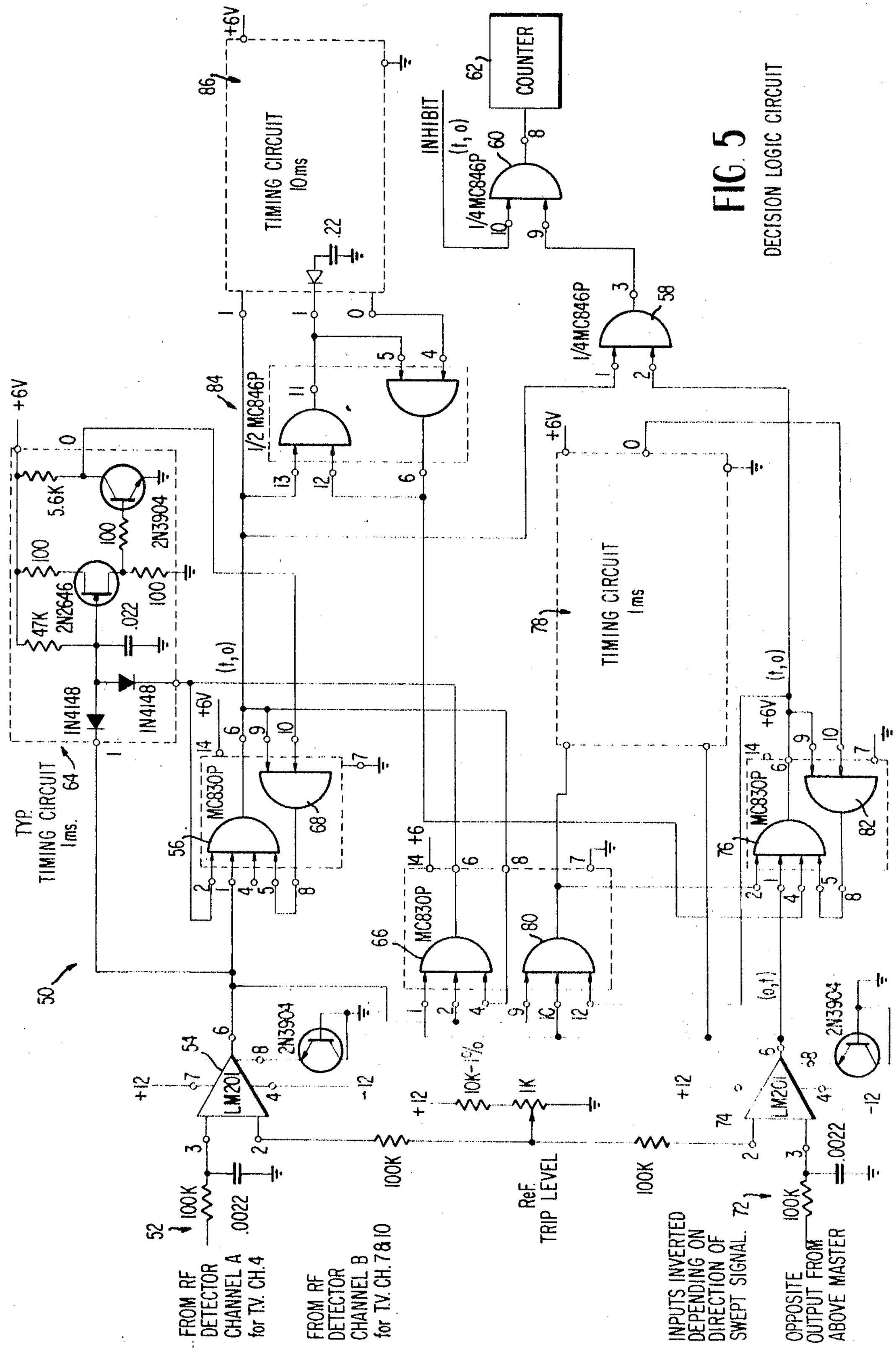
FIGURE 5 is a more detailed circuit diagram of the decision logic circuit for that channel.

FIGURES 4 and 5 are detailed circuit diagrams of portions of channel 1 illustrated in FIGURE 1. FIGURE 4 illustrates that portion of channel 1, including mixer 24, the comb filter comprising crystal filters 32 and 34, amplifiers 40, limiters 42, AM detectors 44 and the gain normalizing control amplifier 46. FIGURE 5 is a detailed circuit diagram of the remaining portions of the channel comprising the decision circuit 50 feeding counter 62. In FIGURES 4 and 5, like parts bear like reference numerals.

Referring to FIGURES 1 through 3, the dual channel receiver has two frequency separated transmission paths from the point of predetection filtering beyond. Thus, as a signal sweeps through the passband of the input, it creates an impulse through one crystal filter and then the other. Behind each of these predetection filters is identical twin electronics through the AM detectors 44. The gain normalizing control loop is used to force the average RF detected level through the second A′ path (slave) to be the same as the first (master). This servoloop therefore causes both plans to have equal gain.

The center frequencies, bandwidth, and impulse responses of the predetection filters are carefully chosen in conjunction with the sweep rate to optimize the operation of the monitor. Impulse noise, which is one of the parameters with which the system must operate, is broad band noise occurring in bursts. In general, no matter where the receiver is tuned or what its tuning sweep rate is, noise bursts will have the same burst time appearance. This is true even if one is observing two different frequency slots during an impulse of noise. The closer the frequency slots, the more exact the coincident response will be if both filters have the same characteristics. However, as mentioned above, the swept CW or coherent local oscillator signal will appear first in one and then the next filter. With the arrangement shown, the continuous wave TV signal can never be in both filters at once.

The monitor does not keep track of where the television local oscillator signals are in the band spread. All that is important to the monitor is that, during a sweep, it counts all television local oscillator signals of sufficient level. Thus, a small delay associated with whether a particular local oscillator signal is counted in the first or second transmission path is unimportant.

In the monitor, the sweep rate of the local oscillator 28 is approximately 3 kilohertz per millisecond. This is faster than the rate of most of the unstable television local oscillator signals, which for 16 kilohertz peak-to-peak is $\pm 2$ kilohertz per millisecond. The chosen predetection bandwidth is 8 kilohertz. Thus, the length of the detected RF impulse for a stable local television oscillator is $$\frac{8\ kHz.}{3\ kHz./ms.}$$

or 2.75 milliseconds. Adding the component for residual FM, the impulse for the 16 kilohertz peak-to-peak signal could be anywhere from 1.5 milliseconds to 8 milliseconds.

The decision circuit 50 following the AM detectors looks at both detected outputs. A signal will enter the top transmission path and then the bottom transmission path. Both filters have an 8 kilohertz bandwidth, with a 12 kilohertz spacing between center frequencies and 30 db attenuation at their skirt crossover points, i.e. 108 in FIGURE 2. With the three kilohertz sweep rate, the local oscillator signal will appear in the bottom transmission path 4 milliseconds after it entered the top transmission path. A signal impulse of the sufficient level (0.8 times the limit output) to trip the level detector 54 in the top transmission path causes one input of the following NAND gate to go positive and also starts the one millisecond timer 64. If the signal remains for one millisecond, timer 64 opens NAND gate 56 via NOR gate 68 and latching lead 70. In this case NAND gate 56 is latched open and a signal is observed at the output and supplied to counter 62.

An output from the top transmission path gates out the bottom transmission path by way of bistable circuit 84 with a 10 millisecond memory supplied by timer 86. Thus, the bottom transmission path is gated off for ten milliseconds after the impulse in the top transmission path has disappeared. This circuit keeps the decision circuit from counting the same signal twice. A signal seen in the top transmission path A can be seen in the bottom path A′ some time less than 10 milliseconds later. The inverse is not true. A signal seen in path A′ should have been in path A prior to being in the bottom path (A′). If a signal is seen in A′ and the 10 millisecond memory has not been activated, it is assumed that it was missed while it was in path A. Path A′ is identical to path A except for the 10 millisecond memory. A signal seen only in path A′ for over one millisecond causes an output signal to be supplied to counter 62.

Impulses due to noise are seen in coincidence in both paths A and A', i.e., the leading edges are within one millisecond of each other. The NAND gates 66 and 80 common to both paths hold off the signal gates 56 and 76, and the ten millisecond timers until this coincidence disappears and no output from the decision circuit will occur no matter how wide the common channel impulse. It is under such conditions that a signal can be missed through path A when a strong impulse of noise occurs coincident with a signal.

Power line noise causes the greatest harm to a single path system. This occurs at 120 hertz frequency (8.3 millisecond spacing) and when severe, impulses can be lost for up to three milliseconds. Noise bursts caused by automobile ignition are shorter (0.3–1 millisecond) and the spacing is about 30–100 milliseconds.

The two filters (comb bandpass filter) bandwidth, skirts, center frequency separation, and sweep speed are all optimized for all of the condiitons of residual FM, 120 hertz noise burst spacing, and adequate decision time. The theoretical maximum impulse time difference between leading edges during a noise burst due to the filters being at different frequencies is 0.5 millisecond, plus 0.25 millisecond for imperfections in matching the filters Therefore, the total time difference between the beginning of noise bursts in the two paths can be 0.75 millisecond. In view of this, the decision time provided is one millisecond. That is, the decision circuit has one millisecond to decide if the impulse is a coherent signal or noise. After the decision is made, the latching causes an output whether or not the decision was correct.

The final NAND gate 60 is for inhibiting an output for known CW signals that are not TV level oscillator signals. The inhibit signal, supplied by way of lead 110, comes from a programmable blanking circuit and inhibits the output at discrete chosen frequency slots.

A benefit afforded by the faster sweep of the present invention is that the monitor can be made to have more sweep per unit time. This inherently improves the system accuracy. It also smooths out the overlap error caused by rotating antenna 12 in that several scans can be made per antenna beam width. The antenna rotation speed is generally in the neighborhood of one revolution per minute.

It is apparent from the above that the present invention provides an improved monitor for detecting and counting local oscillator signals from receiving sets and especially from TV receivers. While described in conjunction with a rotating antenna 12 mounted on a tower, the device of the present invention can be incorporated in an aircraft or can be used to detect signals over wire lines in conjunction with a system of the type shown and described in copending application Ser. No. 699,078 filed Jan. 19, 1968. Important features of the present invention include the fact that the two path decision circuit and comb filter arrangement yields improved performance to TV local oscillator signals with high residual frequency modulation and ignores impulse noise which is common to both channels. Signals missed in one path, such as path A, because of impulse noise, are counted through path A'. On the other hand, signals counted through path A are not again counted through path A'. The common path gating allows a faster sweep rate and this sweep rate is chosen to be faster than the rate of the residual FM of the television local oscillator signals thereby eliminating previous multiple count problems.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a receiving set monitor having a mixer and a swept local oscillator coupled to said mixer for comparing the frequency of incoming signals with the frequency of said oscillator, a pair of signal transmission paths coupled to said mixer, each of said paths having a different passband, and means coupled to said paths for sensing a signal in one of said paths but rejecting all signals which occur substantially simultaneously in both paths.

2. Apparatus according to claim 1 wherein said passbands are spaced in frequency and of equal width.

3. Apparatus according to claim 1 including means coupled to said paths for rejecting a signal in one of said paths for a predetermined time after occurrence of a signal in the other of said paths.

4. Apparatus according to claim 1 wherein said sensing means comprises a counter coupled to said two paths.

5. Apparatus according to claim 1 wherein said sensing means comprises a logic decision circuit coupled to said two paths, and a counter coupled to the output of said decision circuit.

6. In a monitor for ascertaining the tuning condition of television receiving sets, a mixer, a swept local oscillator and a pair of filters coupled to said mixer and defining a pair of moving frequency slots through which incoming signals may pass, and a decision circuit coupled to said slots, said decision circuit including means for rejecting signals which pass substantially simultaneously through said slots.

7. Apparatus according to claim 6 wherein said filters are crystal filters each having a bandwidth of eight kilohertz.

8. Apparatus according to claim 6 wherein said swept oscillator sweeps through a frequency band of from three to four megahertz.

9. Apparatus according to claim 6 wherein the sweep rate of said oscillator is approximately three kilohertz per millisecond.

10. A monitor for ascertaining the listening habits of radio and television users comprising a plurality of channels for passing different bands of frequencies approximately three to four megahertz wide, each of said channels comprising a mixer, a swept oscillator coupled to said mixer for mixing the frequency of incoming signals with the frequency of said oscillator, a comb filter coupled to the output of said mixer, said comb filter, mixer and swept oscillator defining a pair of spaced moving frequency slots through which incoming signals may pass, and means coupled to said comb filter for rejecting signals which pass substantially simultaneously through both slots.

11. Apparatus according to claim 10 wherein said signal rejecting means is responsive to signals which pass through said slots within one millisecond of each other.

12. Apparatus according to claim 10 wherein said comb filter is coupled to a pair of parallel transmission paths, and a decision circuit coupled to said paths.

13. Apparatus according to claim 12 wherein said decision circuit includes data logic elements.

14. Apparatus according to claim 12 wherein said decision circuit includes means for rejecting signals in one of said paths for a predetermined time after a signal has passed through said other path.

15. A monitor for ascertaining the listening habits of radio and television users comprising a signal input, a plurality of channels including frequency translators coupled to said input for passing different bands of frequencies through said channels, each channel comprising a mixer, a swept oscillator coupled to said mixer for mixing the frequency of incoming signals with the frequency of said oscillator, a pair of crystal filters coupled to the output of said mixer, said filters having equal but spaced passbands, said filters, mixer and swept oscillator defining a pair of spaced moving frequency slots through which signals from said input may pass, parallel transmission paths coupled to said filters, a decision circuit coupled to said transmission paths for rejecting signals which are passed substantially simultaneously by said filters, and a counter coupled to the outputs of said paths.

16. Apparatus according to claim 15 wherein said input comprises a directional antenna whose radiation path is swept over the area to be monitored.

17. A method of counting local oscillator signals from radio and television sets comprising sweeping a pair of moving frequency slots through the frequency band of said signals at a rate greater than the frequency modulation on said signals, and rejecting signals which pass through both said slots within a predetermined time of each other.

18. A method according to claim 17 including rejecting signals passing through one of said slots for a predetermined time after a signal has passed through the other of said slots.

References Cited

UNITED STATES PATENTS

| | | | |
|---|---|---|---|
| 2,422,664 | 6/1947 | Feldman | 325—65 |
| 2,954,465 | 9/1960 | White. | |
| 3,299,355 | 1/1967 | Jenks | 325—31 |
| 3,312,900 | 4/1967 | Jaffe | 325—31 |

RALPH D. BLAKESLEE, Primary Examiner

A. J. MAYER, Assistant Examiner

U.S. Cl. X.R.

179—2; 325—65, 304, 307, 416, 462